(12) United States Patent
Medapalli et al.

(10) Patent No.: US 10,880,884 B2
(45) Date of Patent: Dec. 29, 2020

(54) DYNAMIC SPACE, FREQUENCY AND TIME DOMAIN COEXISTENCE

(71) Applicant: Avago Technologies General IP (Singapore) Pte. Ltd., Singapore (SG)

(72) Inventors: Kameswara Rao Medapalli, San Jose, CA (US); Florin Baboescu, San Diego, CA (US); Mark Gonikberg, Sunnyvale, CA (US); Surendra Babu Mandava, Saratoga, CA (US); Asish Makkattil Ratnan, Bangalore (IN); Payel Banerjee, Kolkata (IN); Nethi Kashi Viswanath, Dist Medak (IN); Sanjay Saha, Bangalore (IN); Sachin Gupta, Bangalore (IN); Neeraj Poojary, Santa Clara, CA (US); Yury Gonikberg, San Jose, CA (US); Sudhirkumar Prajapati, Bangalore (IN); Steven Hall, Olivenhain, CA (US); Knut Terje Hermod Odman, Encinitas, CA (US); Prasanna Desai, Elfin Forest, CA (US); Shawn Ding, San Diego, CA (US); Suryakant Maharana, Bangalore (IN); Bijoy Bhukania, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 321 days.

(21) Appl. No.: 15/786,529

(22) Filed: Oct. 17, 2017

(65) Prior Publication Data
US 2018/0054820 A1   Feb. 22, 2018

Related U.S. Application Data

(62) Division of application No. 13/717,133, filed on Dec. 17, 2012, now Pat. No. 9,826,524.

(Continued)

(51) Int. Cl.
*H04W 72/04* (2009.01)
*H04W 52/02* (2009.01)
(Continued)

(52) U.S. Cl.
CPC ........ *H04W 72/0446* (2013.01); *H04B 15/00* (2013.01); *H04W 16/04* (2013.01);
(Continued)

(58) Field of Classification Search
CPC combination set(s) only.
See application file for complete search history.

(56) References Cited

U.S. PATENT DOCUMENTS

2009/0180451 A1   7/2009   Alpert et al.
2010/0304770 A1   12/2010  Wietfeldt et al.
(Continued)

*Primary Examiner* — Erica Navar
(74) *Attorney, Agent, or Firm* — Morgan, Lewis & Bockius LLP

(57) ABSTRACT

Various methods and systems are provided for space, frequency and time domain coexistence of RF signals. In one example, among others, a communication device includes a coexistence manager capable of monitoring operating conditions of a cellular modem and a coexistence assistant capable of monitoring operating conditions of a wireless connectivity unit. The coexistence manager is capable of modifying operation of the modem and/or unit based on an operating condition change. In another example, a method includes detecting a change in antenna isolation and/or operating temperature of a FE filter, determining filtering characteristics of the FE filter based at least in part upon the change, and modifying communications of coexisting communication protocols based at least in part upon the filtering characteristics. In another example, a TX/RX configuration for coexisting communication protocols is determined and communications in a protocol is modified based at least in part upon the TX/RX configuration.

20 Claims, 4 Drawing Sheets

Related U.S. Application Data

(60) Provisional application No. 61/570,922, filed on Dec. 15, 2011.

(51) Int. Cl.
    *H04W 74/04*     (2009.01)
    *H04B 15/00*     (2006.01)
    *H04W 16/04*     (2009.01)
    H04W 72/12     (2009.01)
    H04W 88/04     (2009.01)
    H04W 16/14     (2009.01)

(52) U.S. Cl.
    CPC ..... *H04W 52/0209* (2013.01); *H04W 72/044* (2013.01); *H04W 74/04* (2013.01); *H04W 16/14* (2013.01); *H04W 72/1215* (2013.01); *H04W 88/04* (2013.01); *Y02D 30/70* (2020.08)

(56) References Cited

U.S. PATENT DOCUMENTS

| | | |
|---|---|---|
| 2011/0212692 A1 | 9/2011 | Hahn et al. |
| 2012/0020348 A1 | 1/2012 | Haverinen et al. |

DYNAMIC SPACE, FREQUENCY AND TIME DOMAIN COEXISTENCE

CROSS REFERENCE TO RELATED APPLICATIONS

This application is a divisional application of U.S. patent application Ser. No. 13/717,133, entitled "DYNAMIC SPACE, FREQUENCY AND TIME DOMAIN COEXISTENCE," filed Dec. 17, 2012, which claims priority to, and the benefit of, U.S. Provisional Patent Application entitled "COEXISTENCE SYSTEMS AND METHODS," having U.S. Patent Application No. 61/570,922, filed Dec. 15, 2011, both of which are herein incorporated by reference in their entireties.

BACKGROUND

Communication systems typically operate in accordance with one or more communication standards. Wireless communication systems may operate in accordance with one or more standards including, but not limited to, Institute of Electrical and Electronics Engineers (IEEE) 802.11, Wi-Fi Direct, Bluetooth, advanced mobile phone services (AMPS), digital AMPS, global system for mobile communications (GSM), code division multiple access (CDMA), local multipoint distribution systems (LMDS), multi-channel-multipoint distribution systems (MMDS), and/or variations thereof. Radio frequency (RF) signals of the wireless communication systems are transmitted over a wide range of frequencies. When RF signals are communicated at frequencies that overlap or are in close proximity to each other, the RF signals can mutually interfere with each other resulting in degraded performance. Examples of RF signals that can mutually interfere include, e.g., cellular long term evolution (LTE) signals, wireless local area network (WLAN) signals, Bluetooth (BT) signals, and BT low energy (BTLE) signals.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
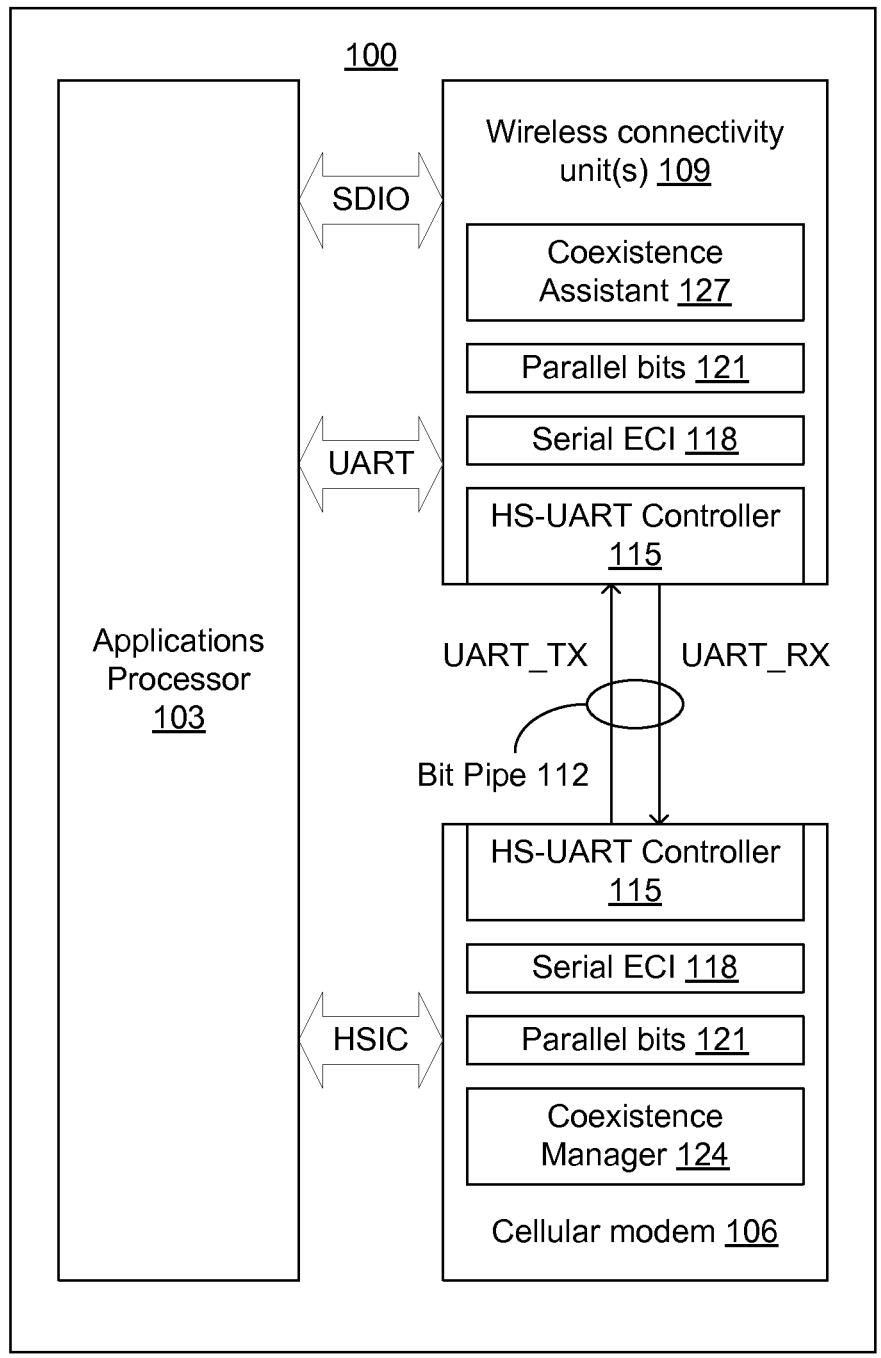
FIG. 1 is a graphical representation of an example of a communication device in accordance with various embodiments of the present disclosure.

The present disclosure relates to space, frequency and time domain coexistence of radio frequency (RF) signals in communication devices such as, e.g., mobile communication devices. Filtering of the RF signals can reduce interference in the frequency domain. However, characteristics of the filter can change during operation of the communication device. In some cases, these changes can result increase the interference caused by coexisting RF signals. Coordination of different RF signals in the time domain can reduce or eliminate mutual interference between the RF signals. Each communication device can include one or more radio transceiver(s). Typically, a transceiver includes a data modulation stage and an RF stage. The data modulation stage (baseband process) converts data to baseband signals in accordance with the particular wireless communication standard. The RF stage (e.g., a transmitter section and/or receiver section) converts between baseband signals and RF signals. The RF stage may convert directly from baseband to RF or may include one or more intermediate frequency stage(s).

Currently, IEEE 802.11 a/b/g/n (Wi-Fi) is the ubiquitous connectivity technology employed at home, work, and other venues through, e.g., a wireless local area network (WLAN). Mobile communication devices such as, e.g., mobile phones, tablet computers, mobile hotspots, etc. can include Wi-Fi capabilities. These communication devices may also support other wireless communication technologies such as, e.g., Bluetooth (BT) to allow for communication with other devices that support BT and/or BT low energy (BTLE), near field communication (NFC), and/or global positioning system (GPS)/global navigation satellite system (GNSS). In some implementations, some or all of these wireless communication technologies may be supported by a single device. In addition, these communication devices may support cellular communications such as, e.g., a cellular data connection such as third-generation (3G), fourth-generation (4G), long term evolution (LTE), or other data communication standard. For example, a communication device can offer tethering capabilities for sharing a LTE data connection with other communication devices over, e.g., a WLAN for Wi-Fi communications, a personal area network (PAN) for BT and/or BTLE communications, and/or other wireless connections.

The coexistence of an LTE/3G/4G communication signal with one or more wireless communication signal(s) can produce mutual interference between the signals, resulting in degraded performance of the communications. For instance, if the operating frequencies of a WLAN or BT connection and an LTE connection are close together, then the performance of both technologies may be degraded due to mutual interference caused by out of band noise of the RF signals. For example, LTE communications can occur in band 7 or band 40, which are both adjacent to the WLAN and BT communication bands. While avoiding operation in the upper 20 MHz of band 40 can mitigate some of the potential interference, throwing away this operating space is not acceptable to most LTE operators. Because of this, LTE transmissions in band 7 or band 40 can result in desensitization of WLAN and/or BT reception. In addition to out of band signals, harmonics of the LTE bands may fall into to the WLAN and/or BT bands. Since, LTE in general operates at a much higher transmit power, the resulting harmonics may also have high power levels that degrade the performance of other wireless communications. In addition, combinations of LTE and WLAN transmissions can fall into the GPS band.

With reference to FIG. 1, shown is a communication device 100 in accordance with various embodiments of the present disclosure. The communication device 100 may correspond to a handheld device, a mobile device, a desktop computer, a laptop computer, personal digital assistants, cellular telephones, smartphones, web pads, tablet computer systems, or other devices with like capability. The communication device 100 can include an application processor 103 in communication with a plurality of collocated communication interfaces such as, e.g., a cellular modem 106 and one or more wireless connectivity unit(s) 109. The cellular modem 106 may be capable of supporting LTE, 2G, 3G, and/or 4G communications. The wireless connectivity unit(s) 109 may be capable of supporting one or more type(s) of wireless communications such as, e.g., WLAN, BT, BTLE, GNSS, and/or NFC.

The cellular modem 106 includes processing circuitry capable of supporting cellular communications such as, e.g., LTE, 2G, 3G, 4G, or other cellular communication protocols. For example, the cellular modem 106 may include processing circuitry for one or more cellular transceiver(s) to support, e.g., LTE and/or communications and one or more RF front end (FE) filter(s) and/or filter circuit(s) to provide frequency domain filtering of the corresponding transmit (TX) and/or receive (RX) signals. The wireless connectivity unit 109 includes processing circuitry capable of supporting wireless communications such as, e.g., WLAN, BT, GNSS, NFC, and/or other wireless communication protocols. For example, a wireless connectivity unit 109 may include processing circuitry for one or more transceiver(s) to support WLAN, BT, GNSS, and/or NFC communications and one or more FE filter(s) and/or filter circuit(s) to provide frequency domain filtering of the corresponding transmit (TX) and/or receive (RX) signals.

In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions.

Front end (FE) filters (including filter circuits) for the transceivers are used to provide a frequency domain solution that reduces or eliminates at least a portion of the mutual interference between coexisting signals. One or more FE filters may be used for each antenna of a communication interface. In the case of diversity, a FE filter may be included for each antenna. Appropriate selection of the FE filter characteristics can eliminate some or all of the mutual interference to allow for coexistence of the different communication signals. For example, by appropriate selection of characteristics such as, e.g., filter order, bandwidth, cutoff frequencies, roll off, etc. can determine the isolation between the different communications. However, the cost of the FE filters depends on the specified characteristics of the filter. Allowing the use of less expensive filters with a rejection that is not as steep, which can result in reduced isolation, may also be accounted for. In addition, variations in the operating conditions of the FE filters such as, e.g., filter temperature can cause the filter characteristics to change and result in an increase in mutual interference. For example, changes in the operating temperature of the FE filter can cause the bandpass filter cutoff frequencies to drift, which may reduce its ability to remove interference from other collocated transceivers.

Careful selection of the FE filters can reduce or eliminate much of the interference experienced during concurrent communications. For example, problems with NFC can be removed by appropriately selecting a harmonic rejection by the FE filters (e.g., loop filters) that avoids interference from or with other communications. However, in other cases a pure frequency domain solution using FE filters has deficiencies that can be addressed in the time domain by controlling the transmissions of a cellular modem 106 and wireless connectivity unit(s) 109. Frequency and time domain coexistence can be achieved by determining the current frequency domain characteristics of the FE filter(s) and dynamically enabling or disabling time domain coexistence based at least in part upon the determined characteristics of the FE filter(s). The responsiveness of the dynamic frequency and time domain coexistence can be improved by implementing the monitoring and control in the cellular modem 106 and wireless connectivity unit(s) 109. One or more high speed communication link(s) allows the cellular modem 106 and wireless connectivity unit(s) 109 to quickly communicate changes in the operating conditions, state information, and/or control time domain coexistence controls.

For example, the cellular modem 106 may communicate with the application processor 103 through, e.g., a high speed inter-chip (HSIC) interface. The wireless connectivity unit 109 may communicate with the application processor 103 through, e.g., a universal asynchronous receiver/transmitter (UART) and/or secure digital input/output (SDIO) interface. The cellular modem 106 and wireless connectivity unit 109 can communicate with each other through, e.g., a two-wire bit pipe interface 112. The bit pipe interface 112 may be a two-wire high speed UART (HS_UART) with a baud rate of, e.g., 4 Mbps. HS-UART controllers 115 control the serial transmissions between the cellular modem 106 and wireless connectivity unit 109.

A serial enhanced coexistence interface (serial ECI or SECI) 118 makes the two-wire bit pipe interface 112 look like an N-wire (e.g., N can be 48, 64 etc.) interface between the cellular modem 106 and wireless connectivity unit 109. The SECI 118 converts parallel bits 121 to serial bits or parallel bits 121 from serial bits, which are communicated over the bit pipe interface 112. The SECI 118 can be used to share real-time information, signals, commands, and/or status between the cellular modem 106 and wireless connectivity unit 109. The SECI 118 may be available regardless of the mode of operation of the cellular modem 106 (e.g., LTE, 2G, 3G, and/or 4G) or the wireless connectivity unit 109 (e.g., WLAN, BT, GNSS, and/or NFC).

An example of the operation of the SECI 118 is provided as follows. The parallel bits 121 are separated into pre-defined nibbles. In the case of a 48-wire interface, the SECI 118 includes a set of 48-bit transmit (TX) and receive (RX) data registers that are divided into twelve 4-bit nibbles. Each nibble is transmitted over the HS-UART bit pipe 112 when it is modified. Nibbles with a lower address have a higher priority than nibbles with a higher address. That is, the nibble with the lowest address is transmitted first when multiple ECI data nibbles are modified at the same time.

Dynamic space, frequency and time domain coexistence may be implemented by a coexistence manager 124 of the cellular modem 106. The coexistence manager 124 is supported by coexistence assistant 127 of the wireless connectivity unit 109. The coexistence manager 124 and coexistence assistant 127 communicate through the bit pipe 112 to share state information, signals, commands, and/or status. The coexistence manager 124 and coexistence assistant 127 monitor the operating conditions and/or state information of the cellular modem 106 and the wireless connectivity unit 109, respectively, to check for changes in the FE filters. Operating conditions and/or state information that may be monitored by the coexistence manager 124 and/or coexistence assistant 127 include, e.g., filter temperatures, transmission power levels, frequencies and timing of operation, modulation and coding schemes being used, ambient temperatures, transmission leakage from other transceivers, link characteristics, traffic constraints or quality, antenna isolation and/or replacement, etc.

For example, the coexistence manager 124 may monitor the temperature of the FE filter(s) corresponding to the transceiver(s) of the cellular modem 106 to determine if a change in the characteristics of one or more of the FE filters has occurred. Similarly, the coexistence assistant 127 may monitor the temperature of the FE filter(s) corresponding to the transceiver(s) of the wireless connectivity unit 109 to determine if a change in the characteristics of one or more of the FE filters has occurred. When the filter operating temperature changes, the filter cutoff frequency of the can shift by, e.g., 10 MHz or more. Depending on whether the FE filter is on the TX or RX legs, and the antenna isolation, this can severely affect the filter isolation. If a change in an operating condition of a FE filter is detected by the coexistence manager 124 and/or coexistence assistant 127, then the effect on the frequency response of the filter is determined. A look up table may be used by the coexistence manager 124 and/or coexistence assistant 127 to determine the current filter characteristics based upon one or more operating condition. In the case of the coexistence assistant 127, it may determine the change in the filter characteristics and communicate the information to the coexistence manager 124 or it may communication the filter operating conditions to the coexistence manager 124, which may then determine the filter characteristics.

The coexistence manager 124 utilizes some or all of the monitored operating conditions, state information and/or changes in the operating conditions and/or state information to determine an allowable TX/RX configuration for each the various coexisting communication protocols. The TX/RX configuration indicates whether transmission (e.g., at a power level greater than a pre-determined value deemed to cause interference) and/or reception is allowed or disallowed for the corresponding cellular or wireless communication protocol. For example, the TX/RX configuration may allow for LTE TX and/or RX concurrent with WLAN RX, but may not allow concurrent WLAN TX to avoid interference. In some cases, the restrictions may be limited to a frequency band or range of frequencies depending, e.g., upon the transmit power and bandwidth of the signal. In another example, concurrent LTE TX and WLAN TX may be restricted to avoid interference in the GPS band. For instance, WLAN TX may be scheduled to avoid overlapping with LTE TX periods or GPS may be desensitized. The operating conditions of the cellular modem 106 and/or wireless connectivity unit(s) 109 may also be adjusted or modified based upon the TX/RX configuration. For example, transmission power or transmission bandwidth (using fewer sub-carriers) may be adjusted to allow for concurrent communications.

The TX/RX configurations can be determined by the coexistence manager 124 based upon one or more operating conditions and/or state information of the communication device 100. The coexistence manager 124 may then control and/or coordinate communications by the cellular modem 106 and wireless connectivity unit(s) 109 based upon the current TX/RX configurations. The coexistence manager 124 can communicate information about the current TX/RX configurations to the coexistence assistant(s) 127, which may then regulate communications supported by the corresponding wireless connectivity unit 109 based upon the current TX/RX configurations. Changes in an operating condition and/or state information may trigger re-evaluation of the one or more of the TX/RX configurations by the coexistence manager 124. Examples may provide a better understanding of these relationships.

Figure 2:
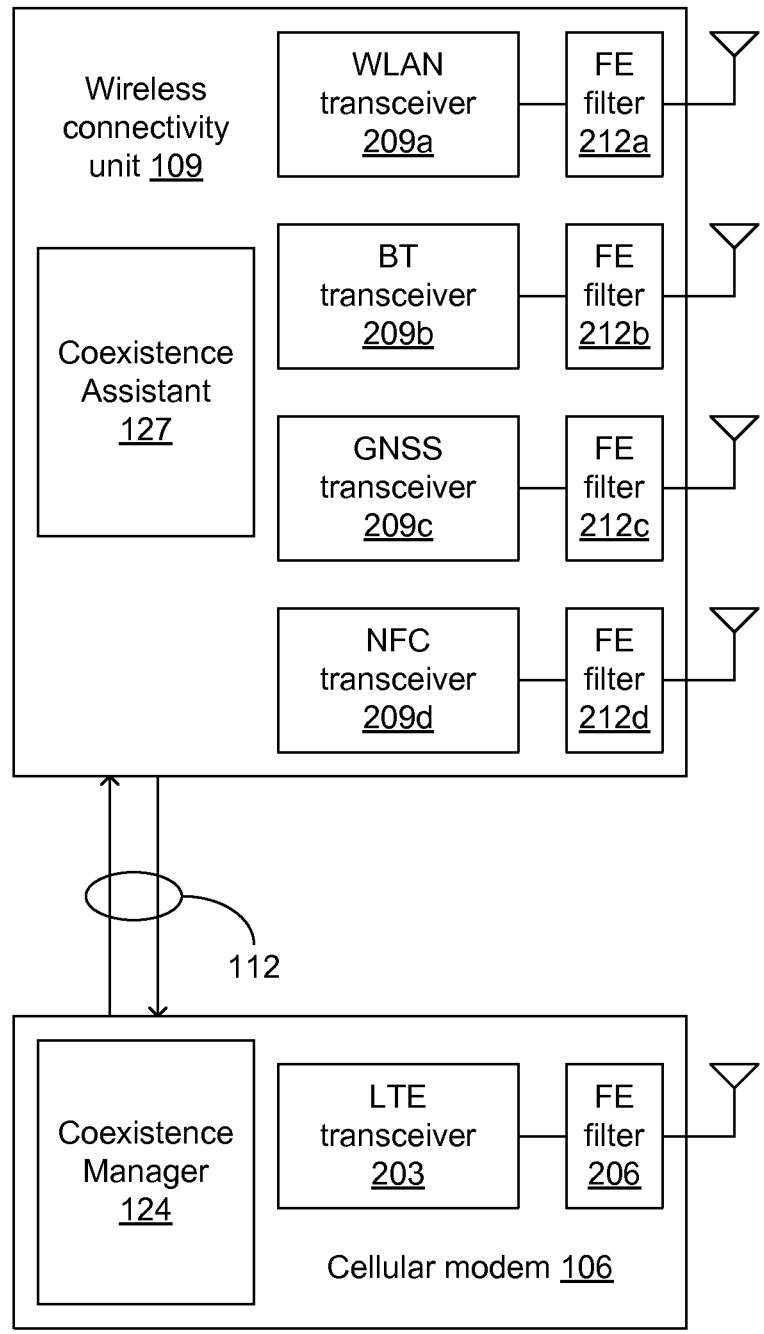
FIG. 2 is a graphical representation of an example of a cellular modem and a wireless connectivity unit of the communication device of FIG. 1 in accordance with various embodiments of the present disclosure.

Referring to FIG. 2, shown is an example of a cellular modem 106 and wireless connectivity unit 109 of the cellular device 100 of FIG. 1. The cellular modem 106 includes a transceiver 203 capable of supporting LTE communications through a FE filter (or filter circuit) 206 and antenna. In some embodiments, the transceiver 203 may support LTE communications through multiple antennas. For example, LTE and/or WLAN communications may use multiple input multiple output (MIMO) antenna configurations. A FE filter 206 may be associated with each antenna. The wireless connectivity unit 109 may support a plurality of wireless communication protocols. In the example of FIG. 2, the wireless connectivity unit 109 includes transceivers 209a-209d that support WLAN, BT, GNSS, and NFC communications, respectively, through a corresponding FE filter (or filter circuit) 212a-212d and antenna. The high speed bit pipe 112 allows for sending both real time signals (with a processing latency in the order of microseconds) and commands (with a processing latency in the order of a millisecond) between the cellular modem 106 and wireless connectivity unit 109.

The coexistence manager 124 monitors the operating conditions and/or state information of the cellular modem 106. For example, the coexistence manager 124 can monitor the operating temperature of the FE filter 206 and track the frequency response characteristics of the FE filter 206 based upon the current filter temperature. In some implementations, the coexistence manager 124 may monitor antenna isolation, which is a function of spatial orientation and separation between the interferer and victim. The coexistence manager 124 may also monitor state information about the LTE transceiver 203 such as, e.g., activity status (on/off, sleep, etc.), LTE access pattern and/or frame configuration, LTE frame synchronization, transmission power levels, frequencies and timing of operation, modulation and coding schemes being used, transmission leakage from other transceivers, link characteristics, etc. Some or all of the information may be communicated to the coexistence assistant 127 for coordination of the wireless communications supported by the wireless connectivity unit 109 using the high speed bit pipe 112. For example, the coexistence manager 124 may send the LTE activity status (on/off, sleep, etc.), LTE access pattern and/or frame configuration, LTE frame synchronization, and/or an indication of transmit or receive activity by the transceiver 203 during the current LTE subframe. The coexistence manager 124 may also send requests for exclusive access for time periods when mutual interference may have a high cost impact on the LTE communications and/or functionality.

The coexistence assistant 127 monitors the operating conditions and/or state information of the wireless connectivity unit 109. For example, the coexistence manager 124 can monitor the operating temperature of one or more of the FE filters 212a-212d and track the frequency response characteristics of the corresponding FE filter 212a-212d based upon the current filter temperature. In some implementations, the monitored filter temperature(s) are sent to the coexistence manager 124, which tracks the frequency response characteristics of the corresponding FE filter 212a-212d based upon the current filter temperature. In some implementations, the coexistence assistant 127 may monitor antenna isolation. The coexistence assistant 127 may also monitor state information about one or more of the transceivers 209a-209d supported by the wireless connectivity unit 109. The monitored information may include, e.g., activity status (on/off, sleep, etc.), transmission power levels, frequencies and timing of operation, modulation and coding schemes being used, transmission leakage from other transceivers, link characteristics, etc. Some or all of the information may be communicated to the coexistence manager 124 for coordination of the cellular communications supported by the cellular modem 106 using the high speed bit pipe 112. For example, the coexistence assistant 127 may send the transmission frequencies and/or an indication of transmit or receive activity by a WLAN, BT, and/or GNSS transceiver 212. The coexistence assistant 127 may also send requests for exclusive access for time periods when mutual interference may have a high cost impact on the wireless communications and/or functionality.

Initially, the coexistence manager 124 determines the TX/RX configurations for the supported communication protocols based at least in part upon the operating conditions and/or state information of the cellular modem 106 and wireless connectivity unit 109. In some cases, the TX/RX configurations may be predefined for initialization and adjusted or modified based upon the operating conditions and/or state information monitored by the coexistence manager 124 and/or coexistence assistant 127. For example, the communication device 100 may initially operate in predefined TX/RX configurations, which are updated a predefined period of time after startup. The coexistence manager 124 may then monitor and coordinate operation of the LTE transceiver 203 based upon the current TX/RX configuration and information and/or indications received from the coexistence assistant 127. Similarly, the coexistence assistant 127 may monitor and coordinate operation of the wireless transceivers 209a-209d based upon the current TX/RX configuration and information and/or indications received from the coexistence assistant 127. Changes in, e.g., the rejection characteristics of a FE filter, antenna isolation between different TX/RX antennas, transmission powers, modulations, and/or coding, etc. may be considered during the determination of the TX/RX configurations.

Figure 3:
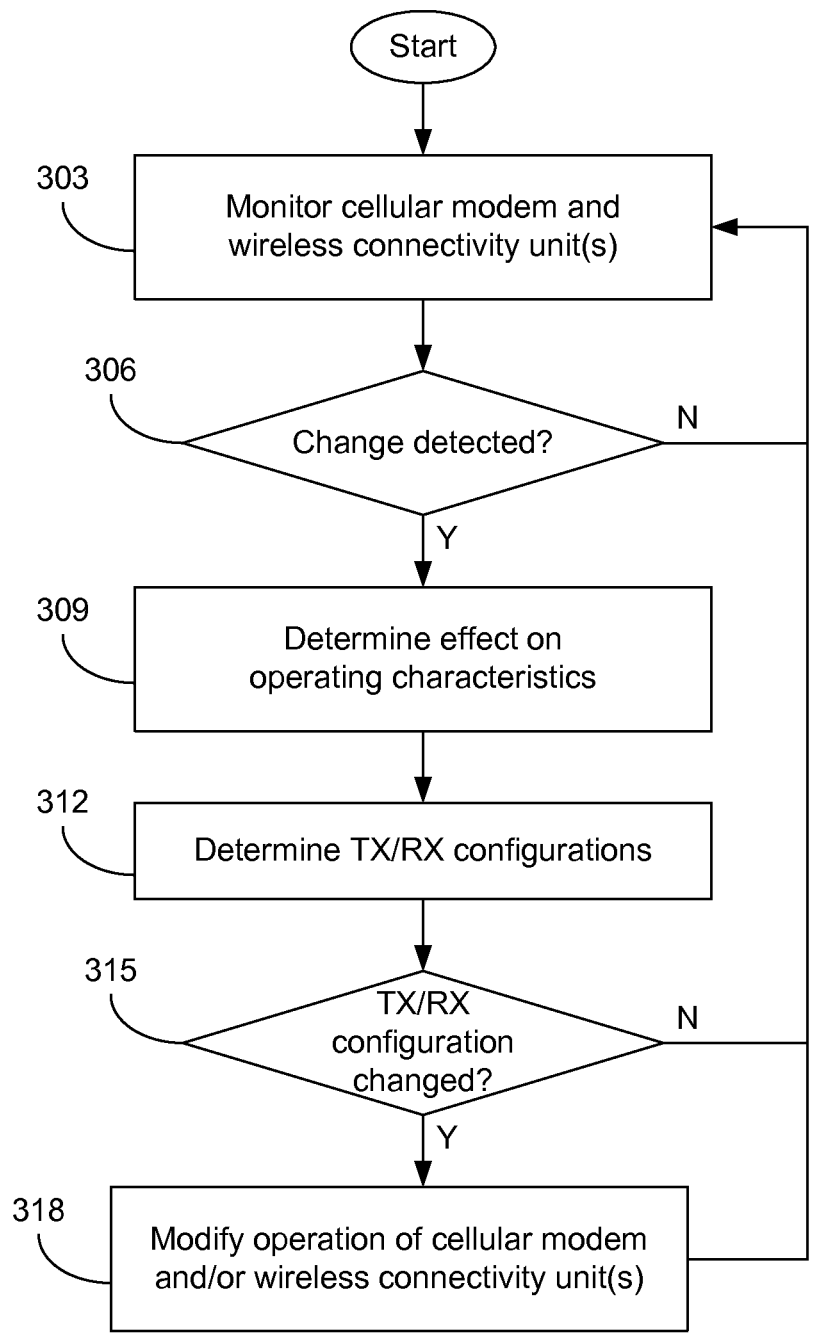
FIG. 3 is a flowchart illustrating an example of dynamic frequency and time domain coexistence of radio frequency (RF) signals in accordance with various embodiments of the present disclosure.

Referring to FIG. 3, shown is a flowchart illustrating an example of dynamic frequency and time domain coexistence of communication protocols supported by a communication device 100. Beginning with 303, the cellular modem 106 and wireless connectivity unit(s) 109 operating conditions and/or state information is monitored by the coexistence manager 124 and/or coexistence assistant 127. In some cases, state information may be determined based upon the monitored operating conditions. For example, the operating temperature of the FE filters 206 and/or 212a-212d are monitored. Based upon the filter temperature, the coexistence manager 124 and/or coexistence assistant 127 can determine the frequency response characteristics of the FE filters 206 and/or 212a-212d by, e.g., using a look up table. The coexistence manager 124 and/or coexistence assistant 127 may monitor the operating conditions and/or state information on continuously, at predefined periodic intervals, at scheduled times, and/or combinations thereof. The current operating conditions and/or state information of the wireless connectivity unit 109 may be communicated to the coexistence manager 124 by the coexistence assistant 127 over the high speed connection 112 (FIG. 2).

If no change in the monitored operating conditions and/or state information is detected in 306, then the coexistence manager 124 and/or coexistence assistant 127 continue to monitor the cellular modem 106 and wireless connectivity unit(s) 109 operating conditions and/or state information in 303. If a change in one or more of the operating conditions and/or state information is detected in 306, then the effect on the operating characteristics is determined in 309. If the coexistence manager 124 detects a change, then the coexistence manager 124 determines the effect on the characteristics associated with the cellular modem 106. If the coexistence assistant 127 detects a change, then the coexistence manager 124 and/or coexistence assistant 127 determines the effect on the characteristics associated with the wireless connectivity unit 109. For example, the coexistence assistant 127 may notify the coexistence manager 124 of the change and the coexistence manager 124 may use the information to determine the effect on the characteristics. In other cases, the coexistence assistant 127 may determine the effect of the change on the characteristics and communicate the information about the characteristics to the coexistence manager 124.

For example, the coexistence assistant 127 may detect a change in the operating temperature of a FE filter 212a-212d and communicate an indication of the filter temperature change to the coexistence manager 124, which determined the effect on the filter characteristics, or the coexistence assistant 127 may determine the effect on the filter characteristics and communicate that information to the coexistence manager 124. In other cases, the transmission power of one of the transceivers 203 and/or 209a-209d (FIG. 2) may change. This may be detected by the coexistence manager 124 and/or an indication of the change may be communicated to the coexistence manager 124. For example, the coexistence manager 124 may detect a change in the transmission power of the LTE transceiver 203. This may also be detected by the coexistence assistant 127 as a change in transmission leakage from the LTE transceiver 203, which can be communicated to the coexistence manager 124. Changes in other operating conditions and/or state information such as transmission frequencies and timing, modulation and coding schemes, link characteristics, etc. may be detected by and/or communicated to the coexistence manager 124 as can be understood.

In 312, the coexistence manager 124 determines the TX/RX configurations of the various communication protocols supported by the cellular modem 106 and wireless connectivity unit(s) 109 based at least in part upon the current operating conditions and/or state information including one or more changes that have been detected. Predefined policies may be used to determine the TX/RX configurations. For example, a change in the operating temperature of the FE filter 212a of the WLAN transceiver 209a may result in a shifting of the frequency response of the FE filter 212a. The coexistence manager 124 may then evaluate whether the frequency separation between the FE filter 212a and the FE filter 206 of the LTE transceiver 203 provides sufficient rejection of interference between LTE and WLAN communications. Policies may be used by the coexistence manager 124 to make this determination. The coexistence manager 124 may also consider other operating conditions and/or states in evaluating the TX/RX configurations. For instance, the transmission power levels of the LTE and WLAN transceivers 203 and 209a may also be considered when determining the TX/RX configurations of LTE and WLAN communications. If the frequency separation between the FE filters 212a and 206 provides sufficient isolation at the current transmission power, the LTE and WLAN TX/RX configurations may remain the same. If sufficient isolation is not provided, then the coexistence manager 124 may determine new LTE and/or WLAN TX/RX configurations based upon the policies. Other factors may also be considered in determining the TX/RX configurations such as, but not limited to, transmission power levels of the other transceivers 209b-209d, transmission frequencies, modulation and/or coding schemes being used, current traffic levels, link characteristics, and/or other conditions/states of the cellular modem 106 and wireless connectivity unit(s) 109.

If the TX/RX configurations of the supported communication protocols do not change in 315, then the coexistence manager 124 and/or coexistence assistant 127 continue to monitor the cellular modem 106 and wireless connectivity unit(s) 109 operating conditions and/or state information in 303. If one or more of the TX/Rx configurations has changed, then the operation of the cellular modem 106 and/or wireless connectivity unit(s) 109 may be modified in 318 to mitigate or eliminate interference effects of the change. The coexistence manager 124 may determine whether TX and/or RX events of one or more of the supported communication protocols are allowed or disallowed. For example, the coexistence manager 124 may determine that the TX and RX scheduling of the LTE and WLAN may be adjusted such as, e.g., disallowing WLAN transmission during TX or RX of LTE communications. The coexistence manager 124 communicates the TX/RX configurations and/or modifications of operation to the coexistence assistant 127, which controls communications by the wireless connectivity unit 109 accordingly. For instance, the coexistence assistant 127 may regulate WLAN transmissions based upon, e.g., the LTE frame configuration, LTE frame synchronization, and/or indications of active TX or RX by the LTE transceiver 203 communicated through the high speed connection 112.

In other cases, the coexistence manager 124 may determine that changes in operating conditions such as, e.g., transmission power of one or more of the transceivers 203 and/or 209a-209d will provide sufficient isolation. For instance, the WLAN link may allow a reduction in transmission power of the WLAN transceiver 209a that avoids the need to modify the TX/RX configurations of the supported communication protocols. The coexistence manager 124 communicates the change in transmission power to the coexistence assistant 127, which controls communications by the WLAN transceiver 209a accordingly. Depending on the conditions, the coexistence manager 124 may also modify operations of the cellular modem 106 and notify the coexistence assistant 127 of the changes. As can be understood, changes in the operating conditions and/or state information may also indicate improvements in isolation, which can result in changes in the TX/RX configurations and/or operation of the cellular modem 106 and/or wireless connectivity unit(s) 109 by the coexistence manager 124. The coexistence manager 124 and/or coexistence assistant 127 may then continue to monitor the cellular modem 106 and wireless connectivity unit(s) 109 operating conditions and/or state information in 303.

Figure 4:
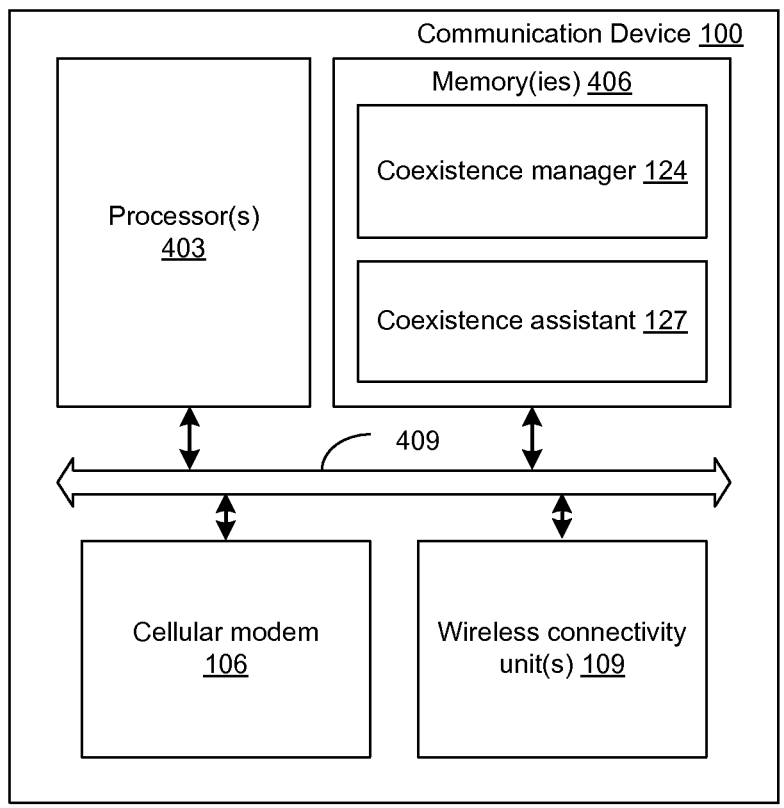
FIG. 4 is a schematic block diagram illustrating an example of the communication device of FIG. 1 in accordance with various embodiments of the present disclosure.

With reference to FIG. 4, shown is a schematic block diagram of the communication device 100 in accordance with various embodiments of the present disclosure. The communication device 100 includes at least one processor circuit, for example, having a processor 403 and a memory 406, both of which are coupled to a local interface 409. The communication device 100 may include a cellular modem 106 and one or more wireless connectivity unit(s) 109, all of which may be coupled to the local interface 409. The cellular modem 106 comprises processing circuitry for supporting cellular communications such as, e.g., LTE, 2G, 3G, 4G, WiMAX, WCDMA, HSDPA, or other wireless communication protocols. The wireless connectivity unit(s) 109 comprise processing circuitry for supporting wireless communications such as, e.g., IEEE 802.11 a/b/g/n, Bluetooth (BT), Bluetooth low energy, near field communication (NFC), global positioning system (GPS)/global navigation satellite system (GNSS), and/or other wireless communication protocols.

In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions. In some cases, portions of the cellular modem 106 and/or wireless connectivity unit(s) 109 may be implemented by processor 403 via local interface 409. The local interface 409 may comprise, for example, a data bus with an accompanying address/control bus or other bus structure as can be appreciated.

Stored in the memory 406 are both data and several components that are executable by the processor 403 and/or by processing circuitry of the cellular modem 106 and/or wireless connectivity unit(s) 109. In particular, stored in the memory 406 and executable by the processor 403 may be a coexistence manager 124, coexistence assistant 127, and potentially other applications and device interfaces. In addition, an operating system may be stored in the memory 406 and executable by the processor 403. In some embodiments, the cellular modem 106 and/or wireless connectivity unit(s) 109 may include memory for storing the coexistence manager 124 and/or coexistence assistant 127. In some cases, the processor 403 and memory 406 may be integrated as a system-on-a-chip.

It is understood that there may be other applications that are stored in the memory and are executable by the processor 403, the cellular modem 106, and/or wireless connectivity unit(s) 109 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, or other programming languages.

A number of software components are stored in the memory and are executable by the processor 403, the cellular modem 106, and/or wireless connectivity unit(s) 109. In this respect, the term "executable" means a program file that is in a form that can ultimately be run by the processor 403, the cellular modem 106, and/or wireless connectivity unit(s) 109. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the coexistence manager 124, coexistence assistant 127, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the coexistence manager 124 and/or coexistence assistant 127 and logic implemented by the cellular modem 106 and/or wireless connectivity unit(s) 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the coexistence manager 124 and/or coexistence assistant 127 that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
   detecting a change in an operating temperature of a front end (FE) filter of a communication device, the FE filter corresponding to one of a plurality of coexisting communication protocols supported by the communication device;
   determining a change in filtering characteristics of the FE filter based at least in part upon the detected change in the operating temperature; and
   modifying a frequency of at least one communication in the plurality of coexisting communication protocols based at least in part upon the determined change in filtering characteristics that corresponds to the detected change in the operating temperature.

2. The method of claim 1, wherein determining the change in the filtering characteristics of the FE filter comprises determining a shift in a frequency response of the FE filter.

3. The method of claim 2, further comprising adjusting transmission power of at least one of the plurality of coexisting communication protocols to mitigate interference between the plurality of coexisting communication protocols.

4. The method of claim 1, further comprising:
   determining transmit/receive (TX/RX) configurations for the plurality of coexisting communication protocols based at least in part upon the determined change in filtering characteristics, wherein the frequency of the at least one communication is modified based upon the determined TX/RX configurations.

5. The method of claim 4, wherein the determination of the TX/RX configurations for the plurality of coexisting communication protocols is based at least in part upon state information of the communication device.

6. The method of claim 5, wherein the state information comprises transmission power levels or transmission bandwidth of the plurality of coexisting communication protocols.

7. The method of claim 1, wherein the plurality of coexisting communication protocols supported by the communication device comprises cellular long term evolution (LTE) communications, wireless local area network (WLAN) communications, and Bluetooth (BT) communications.

8. A device, comprising:
   at least one processor circuit configured to: detect a change in an operating temperature of a front end (FE) filter of the device, the FE filter corresponding to one of a plurality of coexisting communication protocols supported by the device;
   determine a change in filtering characteristics of the FE filter based at least in part upon the detected change in the operating temperature; and
   modify a frequency of at least one communication in the plurality of coexisting communication protocols based at least in part upon the determined change in filtering characteristics that corresponds to the detected change in the operating temperature.

9. The device of claim 8, wherein the at least one processor circuit is configured to determine the change in the filtering characteristics of the FE filter by determining a shift in a frequency response of the FE filter.

10. The device of claim 9, wherein the at least one processor circuit is configured to adjust transmission power of at least one of the plurality of coexisting communication protocols to mitigate interference between the plurality of coexisting communication protocols.

11. The device of claim 8, wherein the at least one processor circuit is further configured to: determine transmit/receive (TX/RX) configurations for the plurality of coexisting communication protocols based at least in part upon the determined change in filtering characteristics, wherein the frequency of the at least one communication is modified based upon the determined TX/RX configurations.

12. The device of claim 11, wherein the determination of the TX/RX configurations for the plurality of coexisting communication protocols is based at least in part upon state information of the device.

13. The device of claim 12, wherein the state information comprises transmission power levels or transmission bandwidth of the plurality of coexisting communication protocols.

14. The device of claim 8, wherein the plurality of coexisting communication protocols supported by the device comprises cellular long term evolution (LTE) communications, wireless local area network (WLAN) communications, and Bluetooth (BT) communications.

15. A computer program product comprising code and a non-transitory computer-readable storage medium, the code comprising:
   code to detect a change in an operating temperature of a front end (FE) filter of a communication device, the FE filter corresponding to one of a plurality of coexisting communication protocols supported by the communication device;
   code to determine a change in filtering characteristics of the FE filter based at least in part upon the detected change in the operating temperature; and
   code to modify a frequency of at least one communication in the plurality of coexisting communication protocols based at least in part upon the determined change in filtering characteristics that corresponds to the detected change in the operating temperature.

16. The computer program product of claim 15, wherein the code to determine the change in the filtering characteristics of the FE filter comprises code to determine a shift in a frequency response of the FE filter.

17. The computer program product of claim 16, wherein the code comprises code to adjust transmission power of at least one of the plurality of coexisting communication protocols to mitigate interference between the plurality of coexisting communication protocols.

18. The computer program product of claim 15, the code further comprising: code to determine transmit/receive (TX/

RX) configurations for the plurality of coexisting communication protocols based at least in part upon the determined change in filtering characteristics, wherein the frequency of the at least one communication is modified based upon the determined TX/RX configurations.

19. The computer program product of claim 18, wherein the determination of the TX/RX configurations for the plurality of coexisting communication protocols is based at least in part upon state information of the communication device.

20. The computer program product of claim 19, wherein the state information comprises transmission power levels or transmission bandwidth of the plurality of coexisting communication protocols.

* * * * *